(12) United States Patent
Alden

(10) Patent No.: US 8,014,824 B2
(45) Date of Patent: Sep. 6, 2011

(54) ARTICLE OF MANUFACTURE INTEGRATED WITH MUSIC AND TELEPHONIC COMMUNICATION DEVICES

(75) Inventor: Richard P. Alden, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 418 days.

(21) Appl. No.: 12/138,331

(22) Filed: Jun. 12, 2008

(65) Prior Publication Data

US 2008/0267440 A1 Oct. 30, 2008

Related U.S. Application Data

(63) Continuation of application No. 11/548,195, filed on Oct. 10, 2006, now Pat. No. 7,395,090, which is a continuation of application No. 10/382,960, filed on Mar. 6, 2003, now Pat. No. 7,187,948.

(60) Provisional application No. 60/370,711, filed on Apr. 9, 2002.

(51) Int. Cl.
*H04B 5/00* (2006.01)
(52) U.S. Cl. .................. 455/557; 455/569.1; 381/74
(58) Field of Classification Search .................. 455/557, 455/569.1, 575.1, 575.2, 90.3, 426.1, 344; 381/74, 79, 123
See application file for complete search history.

(56) References Cited

U.S. PATENT DOCUMENTS

| 4,517,413 A | 5/1985 | Pavitt, Jr. |
| 4,539,700 A * | 9/1985 | Sato .............................. 381/333 |
| 4,653,087 A | 3/1987 | Galich |
| 4,876,724 A * | 10/1989 | Suzuki ........................... 381/385 |
| 4,882,745 A | 11/1989 | Silver |
| 5,099,514 A | 3/1992 | Acree |
| 5,148,002 A * | 9/1992 | Kuo et al. ...................... 219/211 |
| 5,563,951 A | 10/1996 | Wang |
| 5,694,467 A | 12/1997 | Young, III |
| 5,694,567 A | 12/1997 | Bourekas et al. |

(Continued)

FOREIGN PATENT DOCUMENTS

CA 2515558 A1 2/2007

(Continued)

OTHER PUBLICATIONS

Office Action mailed Jul. 28, 2005 (Paper No. 20050605), U.S. Appl. No. 10/382,960, filed Mar. 6, 2003 (Designated as Document 1).

(Continued)

*Primary Examiner* — Blane J Jackson
(74) *Attorney, Agent, or Firm* — Workman Nydegger

(57) ABSTRACT

An article of manufacture, such as a jacket or backpack, integrates the services of an audio delivery device, such as an MP3 player, with the services of a two-way communication device, such as a mobile phone, or a two-way radio such as a walkie talkie, citizen band radio, HAM radio, marine or aviation radio, and the like. The article integrates the reception and provision of input and output signals from both the audio devices within the article, thereby enabling a user to listen to music or to receive and place phone calls while engaged in activity. In one implementation, the article provides these functions by holding one or more devices for communicably connecting and switching the audio and communication devices, mixing signals received therefrom, and optionally enabling a user to reduce the volume or mute the signals as desired.

20 Claims, 10 Drawing Sheets

U.S. PATENT DOCUMENTS

| | | | |
|---|---|---|---|
| 5,757,929 A * | 5/1998 | Wang et al. | 381/300 |
| 5,978,689 A | 11/1999 | Tuoriniemi et al. | |
| 6,006,115 A | 12/1999 | Wingate | |
| 6,091,812 A | 7/2000 | Iglehart et al. | |
| 6,397,087 B1 | 5/2002 | Kim et al. | |
| 6,519,475 B1 | 2/2003 | Kim | |
| 6,690,947 B1 | 2/2004 | Tom | |
| 6,792,124 B2 | 9/2004 | Tilbury | |
| 6,873,862 B2 * | 3/2005 | Reshefsky | 455/569.1 |
| 6,985,592 B1 | 1/2006 | Ban et al. | |
| 7,035,422 B1 | 4/2006 | Wiener | |
| 7,251,332 B2 * | 7/2007 | Eves | 381/11 |
| 7,292,880 B2 * | 11/2007 | Lehtonen | 455/569.1 |
| 7,395,090 B2 | 7/2008 | Alden | |
| 7,519,192 B1 | 4/2009 | Laycock | |
| 2001/0033666 A1 | 10/2001 | Benz | |
| 2001/0050991 A1 * | 12/2001 | Eves | 381/11 |
| 2003/0043972 A1 | 3/2003 | Burnham et al. | |
| 2003/0073460 A1 | 4/2003 | van Pelt et al. | |
| 2003/0079035 A1 | 4/2003 | Boyd et al. | |
| 2003/0119566 A1 | 6/2003 | Chen | |
| 2004/0154076 A1 | 8/2004 | Yoo | |
| 2004/0192402 A1 | 9/2004 | Zatloukal et al. | |
| 2004/0204042 A1 | 10/2004 | Neaves | |
| 2005/0130697 A1 | 6/2005 | Dyer | |
| 2006/0062413 A1 | 3/2006 | Wehrell | |
| 2006/0099864 A1 | 5/2006 | Crumrine | |
| 2006/0182297 A1 | 8/2006 | Cyr | |
| 2007/0004472 A1 | 1/2007 | Gitzinger | |
| 2007/0245444 A1 | 10/2007 | Brink | |
| 2011/0019861 A1 | 1/2011 | Wolfe | |

FOREIGN PATENT DOCUMENTS

| | | | |
|---|---|---|---|
| EP | 1068997 | | 1/2001 |
| EP | 1176783 | | 1/2002 |
| EP | 1760896 | A1 | 3/2007 |
| GB | 2296157 | | 6/1996 |
| GB | 2357663 | | 6/2001 |
| GB | 2365692 | A | 2/2002 |
| JP | 10-200990 | A | 7/1998 |
| JP | 2001145167 | A | 5/2001 |
| JP | WO0184727 | A1 | 11/2001 |
| WO | WO0070779 | A1 | 11/2000 |
| WO | WO03099061 | A1 | 12/2003 |
| WO | WO2004025829 | A1 | 3/2004 |
| WO | WO2004/107141 | A1 | 12/2004 |

OTHER PUBLICATIONS

Office Action mailed Dec. 23, 2005 (Paper No. 20051105), U.S. Appl. No. 10/382,960, filed Mar. 6, 2003 (Designated as Document 2).

Office Action mailed Sep. 15, 2006 (Paper No. 20060804), U.S. Appl. No. 10/382,960, filed Mar. 6, 2003 (Designated as Document 3).

Office Action mailed Dec. 18, 2006 (Paper No. 20061111), U.S. Appl. No. 10/382,960, filed Mar. 6, 2003 (Designated as Document 4).

"What is DuoFree?" [online] [retrieved Jan. 23, 2003]. Retrieved from the Internet URL: http://www.alphaomegatele.com/product-main.htm, 5 pgs.

"MP3 Phone Home" by Nate Heasley, Digital Living Today [online] [retrieved Sep. 18, 2002]. Retrieved from the URL: http://netscape. digitallivingtoday.com/netscape/digitallifestiles/gizmo/mp3_phonehome, 1 pg.

"Ericsson Hands-Free Earbud Headset with Answering Button for Ericsson T68 Phones", AMAZON.COM [online] [retrieved Sep. 18, 2002). Retrieved from the Internet URL: http://www.amazon.com/exec/obidos/tg/stores/detail/-/wireless/B000056C5H/ref=pd_sbs_..., 3 pgs.

Motorola Original Accessories, Verizon Wireless Online, Copyright Motorola, Inc. 2002 [online]. Retrieved from the Internet URL: www.verizonwireless.com, 2 pgs.

"The Ultimate Intercom, Pro 3000 Intercom" Autocom Specialist Communications, Copyright Autocom Products Ltd. 1997 [online] [retrieved Aug. 4, 2006]. Retrieved from the Internet URL: http://web.archive.org/web/20000304003127/http://www.autocom.co.uk/, 14 pgs.

"The Best and/or Smartest Intercom", The Aviation Consumer Magazine, Apr. 1994, DRE Communications Inc., [online] [retrieved Jun. 23, 2005]. Retrieved from the Internet URL: http://www.drecomm.com/404product.htm.

"The Ultimate Expandable Rider Audio/Communication Systems", Autocom Specialist Communications, Warwick England, product brochure of the Active-Rider Kit 3—Digital File Creation Date: Jun. 1, 2005, 8 pgs.

"Instructional Manual and Warranty for Part 4. (Pro-7-Sport) Expandable rider system", Autocom Specialist Communications, Warwick, England, Digital File Creation Date: May 29, 2003, 6 pgs.

Office Action mailed Jan. 25, 2008 (Paper No. 20080120), U.S. Appl. No. 11/548,195, filed Oct. 10, 2006 (Designated as Document 5).

Notice of Allowability mailed May 16, 2008 (Paper No. 20080417), U.S. Appl. No. 11/548,195, filed Oct. 10, 2006 (Designated as Document 6).

Notice of Allowability mailed Jan. 15, 2007 (Paper No. 20061220), U.S. Appl. No. 10/382,960, filed Mar. 6, 2003.

EPO (Jan. 20, 2006) Search Report and Opinion, EP Application Publication No. 1760896, filed Aug. 29, 2005.

EPO (Oct. 17, 2007) Office Action, EP Application Publication No. 1760896, filed Aug. 29, 2005.

EPO (Apr. 21, 2008) Response to Office Action, EP Application Publication No. 1760896, filed Aug. 29, 2005.

EPO (Aug. 18, 2008) Office Action, EP Application Publication No. 1760896, filed Aug. 29, 2005.

EPO (Jan. 15, 2009) Response to Office Action, EP Application Publication No. 1760896, filed Aug. 29, 2005.

EPO (Jun. 14, 2010) Indication of Patent Grant, EP Application Publication No. 1760896, filed Aug. 29, 2005.

CA (Nov. 27, 2008) Office Action, CA Application No. 2,515,558 filed Aug. 10, 2005.

CA (Apr. 27, 2009) Response to Office Action, CA Application No. 2,515,558 filed Aug. 10, 2005.

CA (Feb. 25, 2010) Notice of Allowance, CA Application No. 2,515,558 filed Aug. 10, 2005.

Bakker, D.M. et al. "Bluetooth End to End," M&T Books, New york, 2002, 7 pages.

Kammer, David et al. "Bluetooth Application Developer's Guide: The Short Range Interconnect".

Office Action mailed Apr. 23, 2010 (Paper No./Mail Adate 20100421), U.S. Reexamination No. 95/001305.

Office Action mailed Dec. 20, 2010 (Paper No./Mail Date 20101214), U.S. Reexamination No. 95/001305.

Office Action mailed Aug. 6, 2010 (Paper No./Mail 20100730), U.S. Reexamination No. 95/001,369.

\* cited by examiner

ARTICLE OF MANUFACTURE INTEGRATED WITH MUSIC AND TELEPHONIC COMMUNICATION DEVICES

The present invention is a continuation-in-part of U.S. patent application Ser. No. 11/548,195, filed on Oct. 10, 2006, entitled "PERSONAL PORTABLE INTEGRATOR FOR MUSIC PLAYER AND MOBILE PHONE," which is a continuation of U.S. patent application Ser. No. 10,382,960 (now U.S. Pat. No. 7,187,948), of the same title, which claims the benefit of priority to U.S. Provisional Patent application No. 60,370,711, filed Apr. 9, 2002, entitled "SPLIT STYLE HEADPHONES." The entire content of each of the above-mentioned patent applications is incorporated by reference herein.

BACKGROUND OF THE INVENTION

1. The Field of the Invention

This invention relates to integrating electronic devices and, more particularly, to novel systems and methods for integrating services provided by personal music players and mobile phones.

2. The Background Art

The use of mobile telephones and other wireless communication devices has increased dramatically in recent years. Likewise, electronic music players, such as MP3, CD, DVD, and like players have proliferated. Some companies have attempted to integrate music players and mobile two-way communication devices into single devices. While integration may reduce the number of devices a user is required to carry, a user may unnecessarily discard devices that are still fully functional, incurring unnecessary expense.

With respect to music players and mobile phones, various conflicts may arise when attempting to operate independent devices simultaneously. For example, users may listen to portable music players while exercising, traveling, working, relaxing, and performing like activities. However, users may desire to simultaneously place and receive phone calls, activities that may be inherently difficult to perform while listening to music or other audio material. For example, a user may be unable to hear a phone ring while listening to music using headphones, earphones, or the like. Moreover, if a user is able to accept a call, the user may be required to remove headphones, reduce the volume of or mute a music player, pick up a mobile phone handset, or like actions, in order to accept or place a call. This may be an excessively clumsy process.

What is needed is apparatus and methods for users to simultaneously accept and place phone calls using a mobile phone or other two-communication device while listening to music, or other audio material using an independent audio delivery device.

What is further needed is apparatus and methods to integrate the services of substantially any arbitrary two-way communication device with substantially any arbitrary music or audio delivery device.

SUMMARY OF THE INVENTION

Embodiments of the present invention include apparatus and methods for integrating two-way communication devices with audio delivery devices, and within one or more articles of manufacture, such as a jacket, backpack, helmet, or the like. An apparatus in accordance with the invention may include a first electrical connector connected to receive a first audio signal from a substantially arbitrarily selectable audio delivery device, such as an MP3, CD, DVD, radio, or other media player. A second electrical connector may be connected to receive a second audio signal from a substantially arbitrarily selectable two-way communication device, such as a mobile phone, or a two-way radio such as a walkie talkie, citizen band radio (e.g. CB), HAM radio, marine and aviation radio, and the like.

A coupling device independent from the audio and two-way communication devices may be connected to receive the first and second audio signals. A third audio signal comprising at least one of the first and second audio signals may be transmitted from the coupling device to an acoustic device, such as headphones, earphones, speakers, or the like to convert the third audio signal to an acoustic wave having an audio range corresponding to a hearing range of a user.

In certain embodiments, a switch may be connected to the apparatus to enable a user to selectively switch between the first and second audio signals to provide the third audio signal to the acoustic device. In other embodiments, a mixer may be connected to the apparatus to mix the first and second audio signals to create the third audio signal. In selected embodiments, the apparatus may include a microphone connected to transmit a voice signal of a user to the two-way communication device. Thus, the two-way communication device may be located away from the face of the user. The apparatus may also include a volume controller connected to selectively control the volume of at least one of the first and second audio signals. In certain embodiments, the volume controller may control the first audio signal (e.g. the audio signal originating from the audio delivery device) so that a user may selectively raise or lower the volume of the music or other media while receiving or placing a call.

In selected embodiments, the apparatus may employ electrical wiring to route the audio signals and the voice signal to and from the coupling device. A switch, selectively operable by a user, may be used to connect at least two of the second audio signal wire, the voice signal wire, and a ground wire, to activate a function of the two-way communication device. For example, if the two-way communication device is a mobile phone, the switch may be used to trigger a function of the mobile phone such as a mute command, a call connect command, a call disconnect command, voice-activated dialing, a command to call the last number dialed, and the like.

The coupling device may contain any or all of the hardware previously described including but not limited to the microphone, the switches, the mixer, and the volume controller. In selected embodiments, the audio signal from the two-way communication device may be characterized by a threshold value. The second audio signal may be accorded priority relative to the first audio signal originating from the audio delivery device. Thus, the second audio signal may interrupt the first audio signal upon reaching the threshold value.

An article of manufacture, such as a jacket, backpack, helmet, or the like, can then be configured to receive the two-way communication device, the audio delivery device, the coupling device, one or more wires (as appropriate), and one or more headphones, earphones, speakers. In some cases, one or more of the two-way communication device, the audio delivery device, and the one or headphones, earphones, or speakers communicate with each other through the coupling device using wireless communication means. These can also communicate via a combination of wired and wireless communication means.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components of the present invention, as generally described and illustrated in FIGS. 1 through 8 herein, could be arranged and designed in a wide variety of different configurations. Thus, the description herein is not intended to limit the scope of the invention, but is merely representative of certain presently preferred embodiments of devices and systems in accordance with the invention. Those of ordinary skill in the art will, of course, appreciate that various modifications to the details herein may easily be made without departing from the essential characteristics of the invention, as described. Thus, the following information is intended only by way of example, and simply illustrates certain presently preferred embodiments consistent with the invention.

Figure 1:
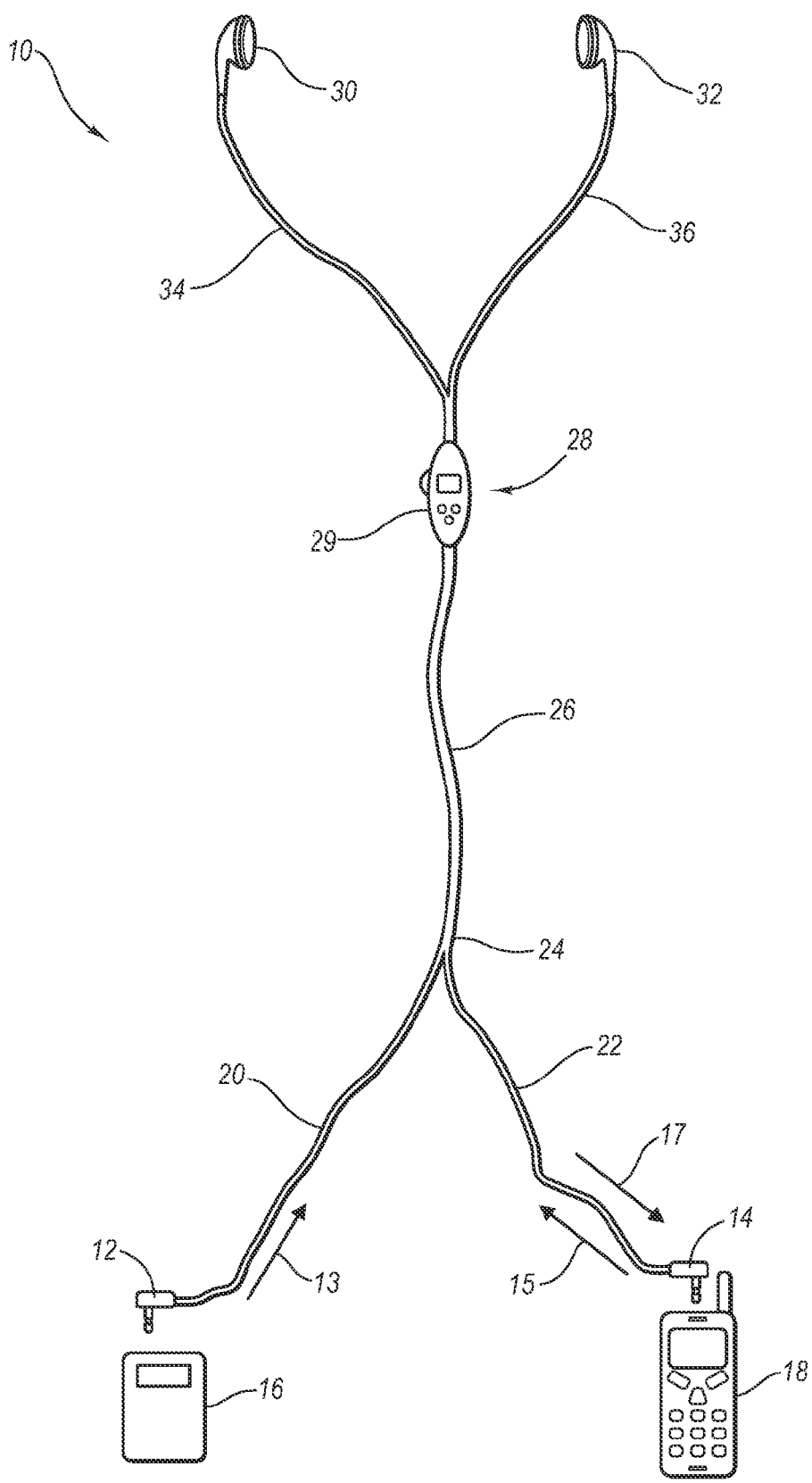
FIG. 1 is a plan view of one embodiment of a personal portable integrator usable with a music player and a mobile phone.

Referring to FIG. 1, a portable integrator 10 for use with a two-communication device 18, such as a mobile phone 18, and an audio delivery device 16, such as a portable MP3 player or CD player, may include electrical connectors 12, 14 to interface with the devices 16, 18. The electrical connectors 12, 14 may vary according to the device. For example, an audio device 16 may require a jack 12 having specific dimensions and with a specified number of contact points. Likewise, a connector 14 may connect to a particular communication device 18. The connectors 12, 14 may be modified as needed to adapt to other devices 16, 18.

The connectors 12, 14 may be adapted to receive and provide signals 13, 15, 17 from the devices 16, 18. For example, the connector 12 may simply receive an audio signal 13 from the audio device 16. The signal 13 may be a monophonic, stereophonic, or like representation of an audio signal 13. Likewise, the connector 14 may receive an audio signal 15 from the communication device 18. In addition, the connector 14 may provide a voice signal 17, or other input signal 17, to the communication device 18 from a user thereof or other outside source.

Sheathed flexible wires 20, 22 or other transmission means such as optical fibers 20, 22, or wireless technology such as BLUETOOTH, may be used to carry the signals 13, 15, 17 to and from the devices 16, 18. In certain embodiments, a reinforcement member 24 may be used to provide strength at a junction point 24 of the lines 20, 22. The reinforcement member 24 may also be used to form a transition point 24 where wires 20, 22 may be bundled together beneath a single protective sheathing 26.

A coupling device 28 may receive and transmit the signals 13, 15, 17 through the path 26. The coupling device 28 may act as a controller 28 or hub 28 to route the signals 13, 15, 17 to an acoustic device 30, 32, such as headphones 30, 32, earphones 30, 32, speakers 30, 32, or the like. The coupling device 28 may also contain a microphone 29, thus providing a hands-free set 29, 30, 32, usable with a mobile phone 18. A pair of wires 34, 36 or other communication paths 34, 36 may connect the coupling device 28 to the acoustic device 30, 32.

Figure 2:
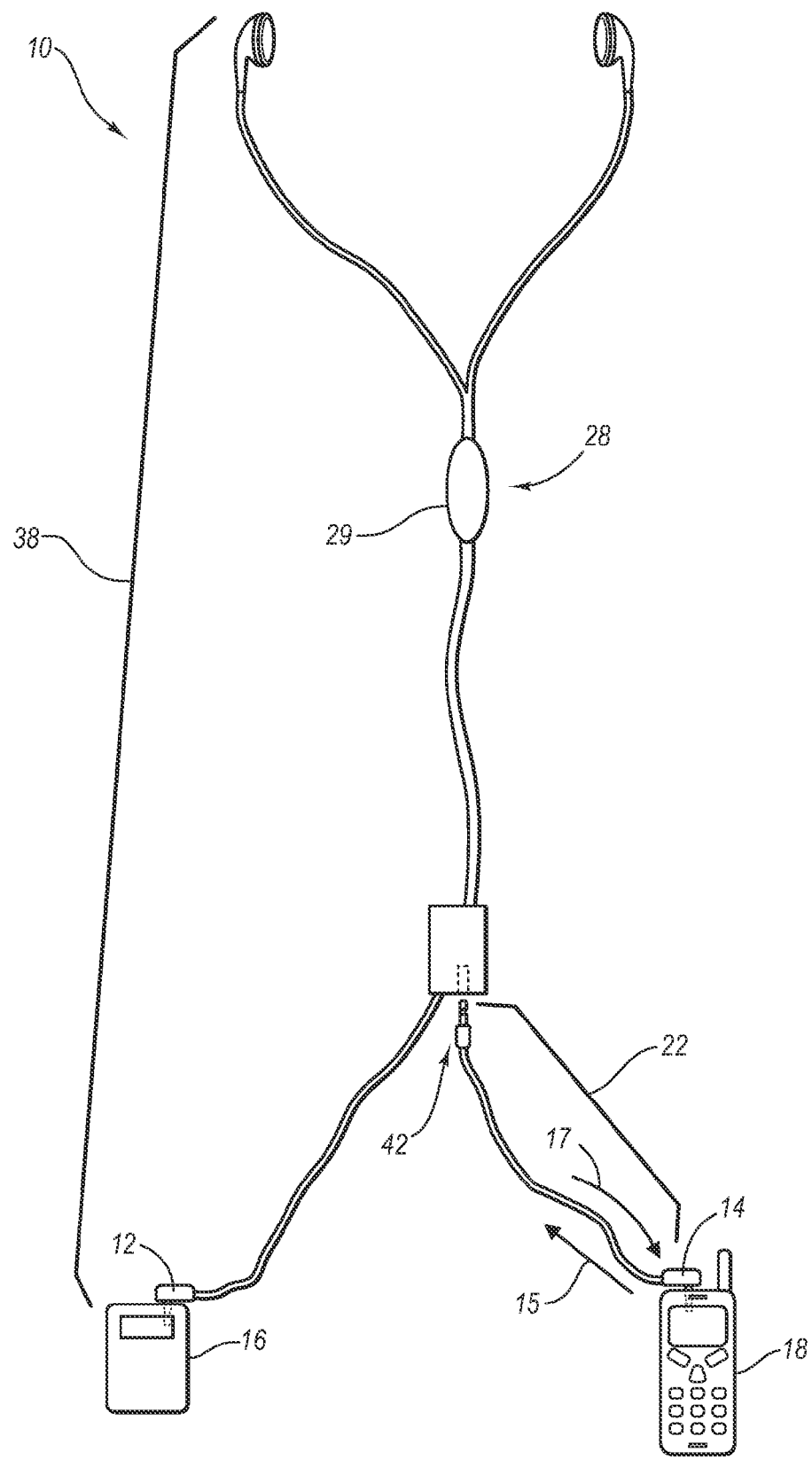
FIG. 2 is a plan view of one embodiment of a personal portable integrator having a device-specific link to a two-way communication device.

Referring to FIG. 2, as was previously mentioned, devices 16, 18, such as mobile phones 18, may not use a standardized jack 12, 14. However, it may be undesirable to provide a separate integrator device 10 for each variation of devices 12, 14 that may be available. Therefore, in certain embodiments, a portion 38 of the portable integrator 10 may be provided as a universal component 38 while another portion 40 may serve as a device-specific component 40. For example, audio devices 16 may use a standardized connector 12 or jack 12. Therefore, a universal component 38 may adapt to the vast majority of audio devices 16 that may be available. Conversely, many two-way communication devices 18, such as mobile phones 18 may not have standardized connections 14. Therefore, device-specific components 40 may be provided having a standard connection 42 that may interface with the universal component 38, while another adapter 14 or connector 14 may be specific to the device 18.

In cases where devices 18 may have a varying number of inputs 17 and outputs 15, dead pins, wires (communication paths), and the like may by used as needed to increase or decrease the number of inputs 15 or outputs 17 according to specific devices 18. In addition, a user may only desire to use a single device 16 for a given period of time and may wish to remove the portion 40 until it is needed.

Figure 3:
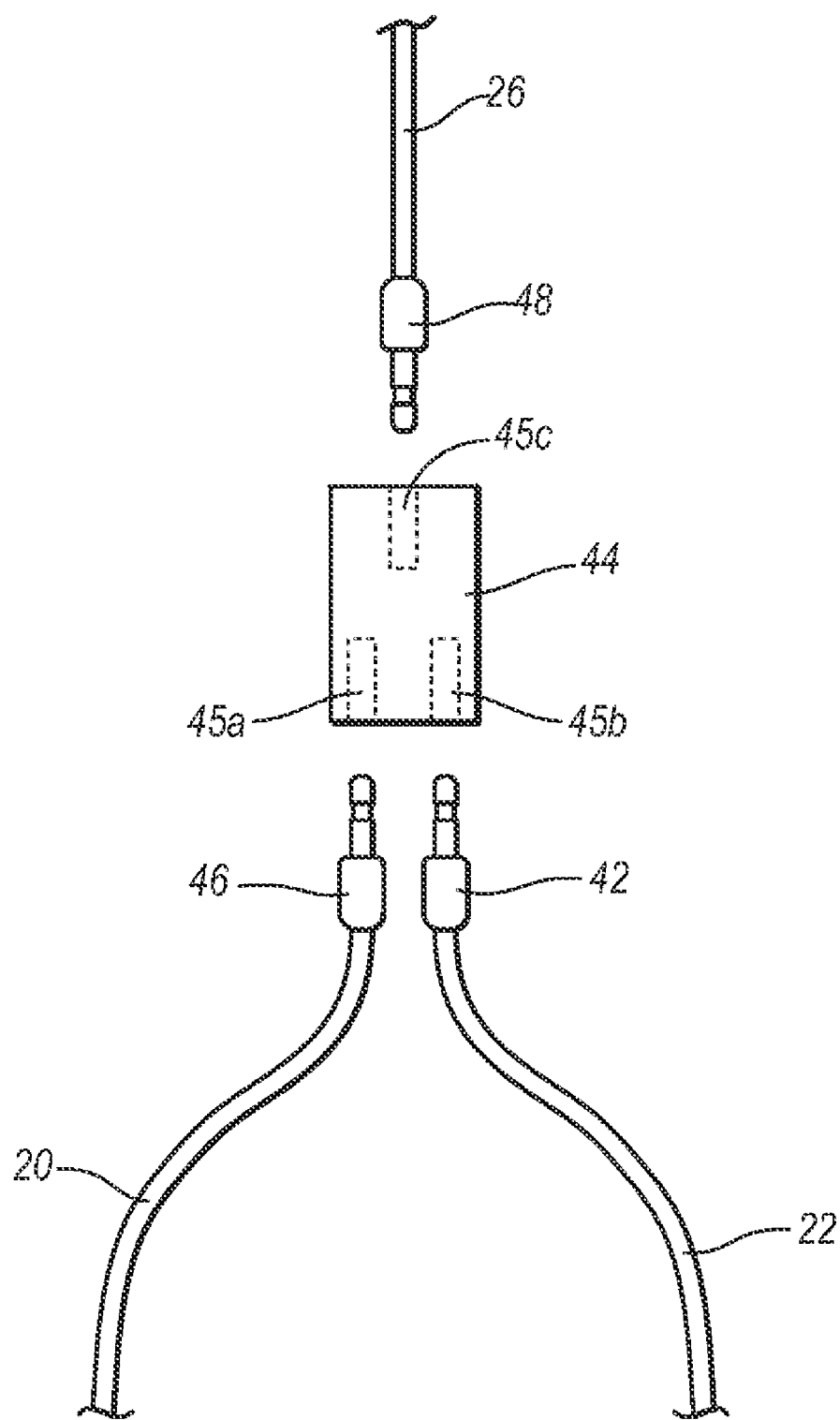
FIG. 3 is a schematic block diagram illustrating one embodiment of connectors that may be used to adapt the invention to a wide variety of devices.

Referring to FIG. 3, while continuing to refer generally to FIGS. 1 and 2, adaptability of the integrator device 10 may be provided in various ways. For example, in certain embodiments, the integrator device 10 may include an adapter 44 that may provide an interface 44 to each of the devices 12, 18, 28, specifically through one or more individual interfaces 45a, 45b, and 45c. In selected embodiments, a connection 20 to an audio device 16 may be swapped at interface 45a with another connection 20 fitted for another device, a connection 22 to a communication device 18 may be swapped at interface 45b with another connection 22 fitted for another communication device 18, a coupling device 28 and an acoustic device 30, 32 may be swapped at interface 45c with other devices 28, 30, 32, and the like. As was previously mentioned, certain portions 26, 20, 22 may be added or deleted as needed by the user. The adapter 44 may use a variety of connectors 42, 46, 48 to connect to the adapter 44, and may also be configured to communicate wirelessly through each of interfaces 45a, 45b, and 45c. In particular, in certain embodiments, the adapter 44 may wirelessly communicate with each of the devices 16, 18 using a wireless technology, thereby acting as a wireless communication hub 44.

Figure 4:
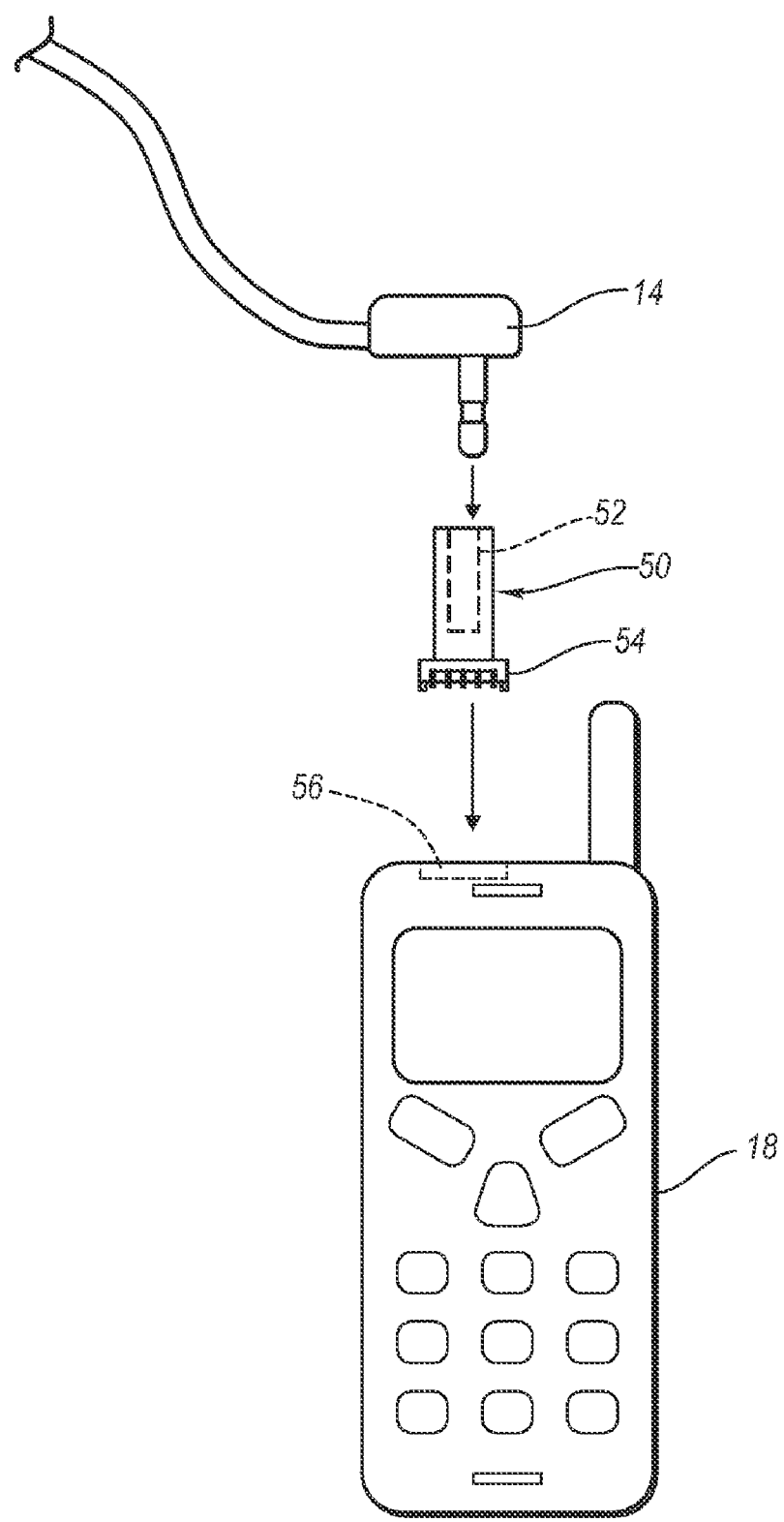
FIG. 4 is a schematic block diagram of one embodiment of an adapter that may be used to interface to a specific device.

Referring to FIG. 4, in selected embodiments, adapters 50 may be provided in accordance with the invention to adapt a portable integrator 10 to specific devices 18. For example, an adapter 50 may include an interface 52 for interfacing with a connector 14. Likewise, the adapter 50 may include another interface 54 that may connect directly to a device 18 at an input 56. In addition, other features may be built into the adapter 50 such as impedance matching, signal amplification, and the like.

Figure 5:
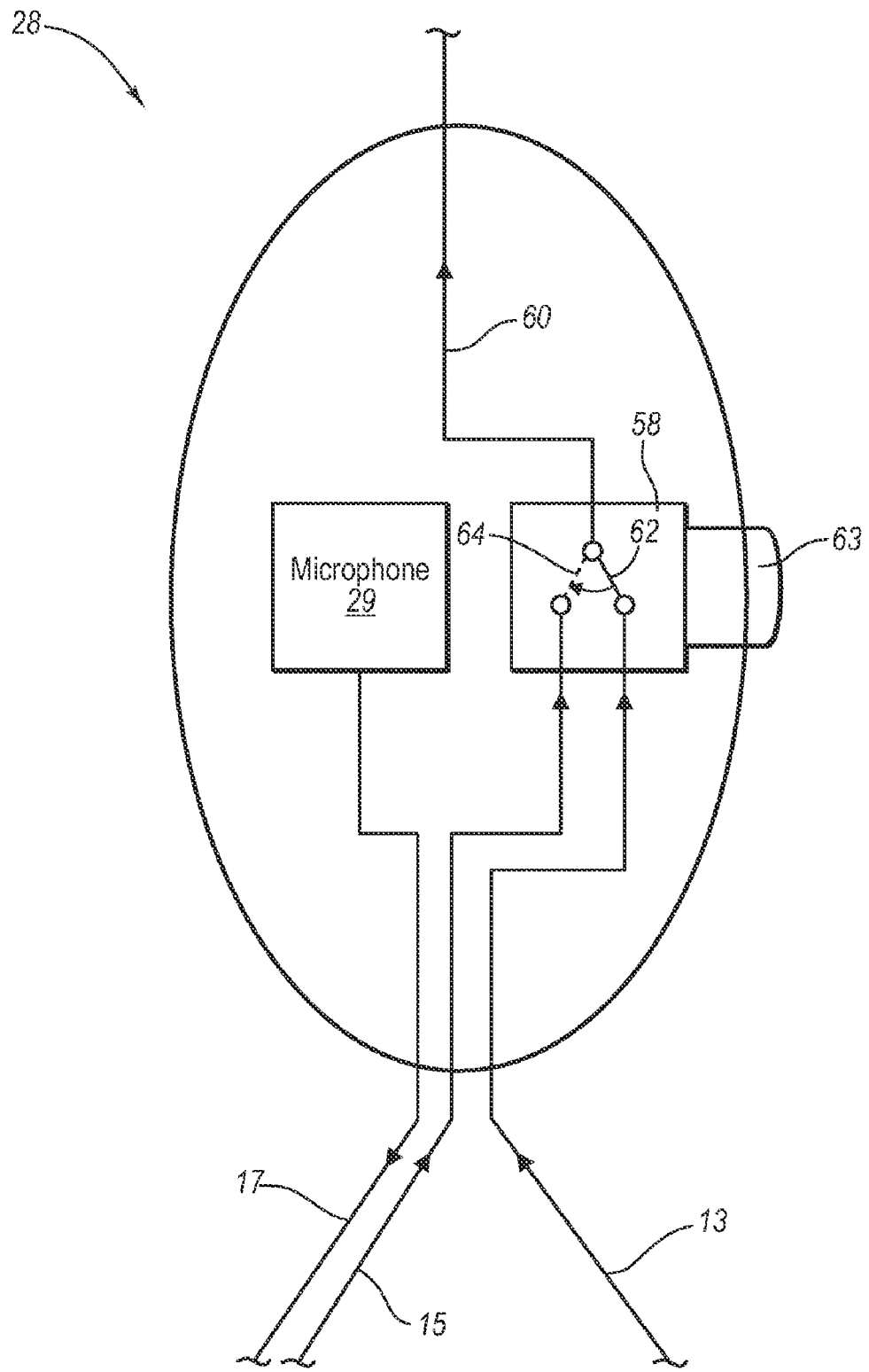
FIG. 5 is a schematic block diagram of one embodiment of components contained within a coupling device in accordance with the invention.

Referring to FIG. 5, in certain embodiments, the coupling device 28 may include a switch 58 to selectively enable a user to connect one of the signals 13, 15 through to the output 60. For example, a user may listen to an audio recording or live transmission from an audio device 16 with the switch 58 in a first position 62. If the user receives or desires to place a call, the switch 58 may be changed to a second position 64 to connect the communication device 18 through to the output 60. The switch 58 may include a button 63 or like mechanism 63 to enable a user operation thereof. Thus, the signal 13 from the audio device 16 may be conveniently and selectively disconnected while the user operates the communication device 18. In this way, simple operation of a switch 58 may enable a user to operate an audio delivery device 16 and a communication device 18 through a single acoustic device 30, 32.

The coupling device 28 may also include a microphone 29 to transmit a voice or other audio signal 17 back to the communication device 18. The coupling device 28 may contain one or several apertures to permit an acoustic wave to directly enter and drive the microphone 29. In certain embodiments, the coupling device 28 may be located, such as by clipping, proximate the face of a user so that the switch 58, microphone 29, and other controls located therein, may be easily accessed and used by a user. Likewise, the communication device 18 and audio device 16 may be located away from the user's face, clipped along a belt line, in a pocket, in a bag, or the like.

Figure 6:
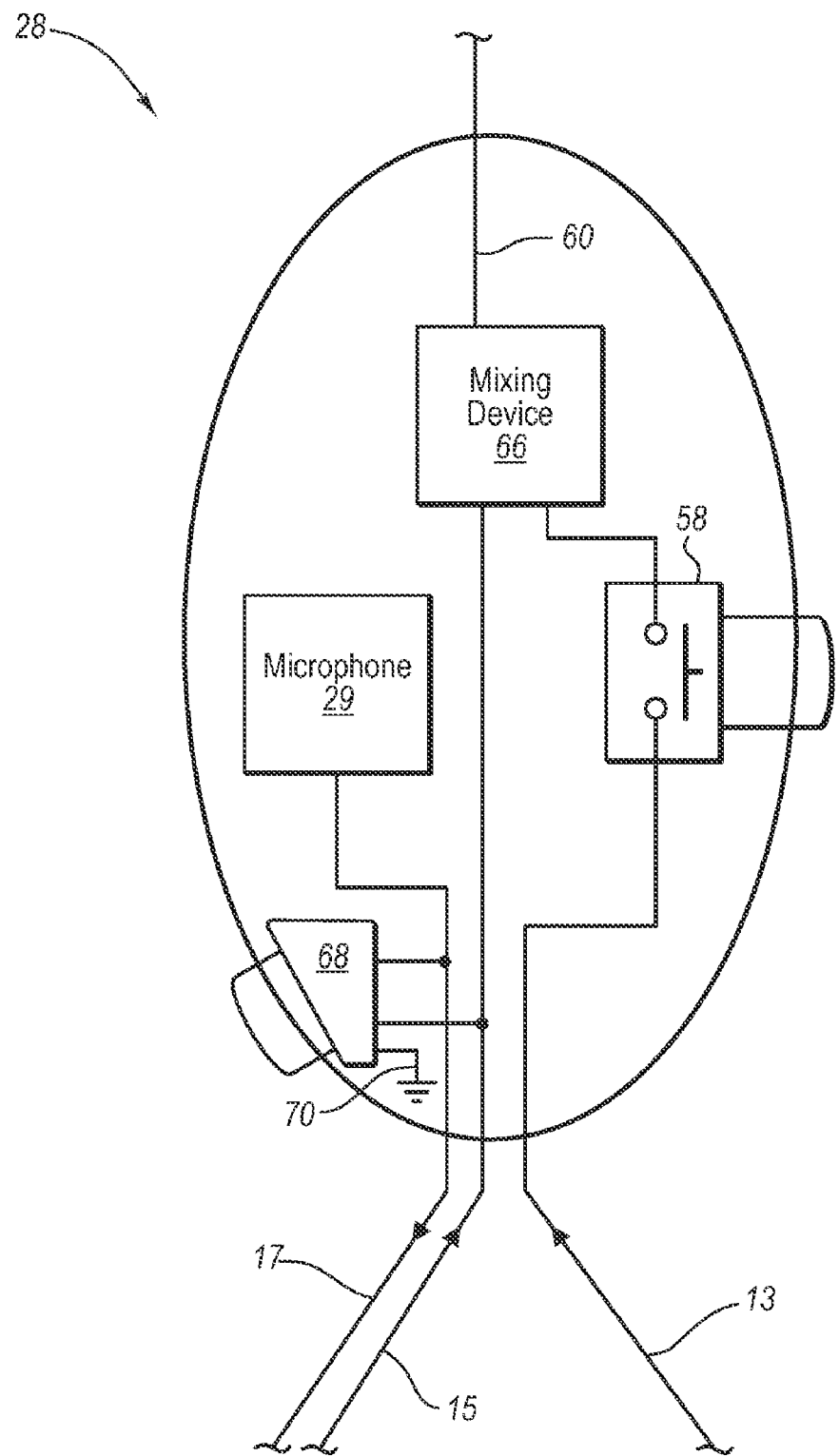
FIG. 6 is a schematic block diagram of an alternative embodiment of components contained within a coupling device in accordance with the invention.

Referring to FIG. 6, in certain embodiments, the coupling device 28 may include a mixer 66 to mix the audio signals 13, 15 originating from the audio and communication devices 16, 18. Thus, the audio signals 13, 15 may be heard simultaneously by a user through an acoustic device 30, 32. In certain instances, a ring or other sound may indicate a call is being received by the communication device 18 and may by audible over the sound of the music or other media through the acoustic device 30, 32. In this case, the audio signal 13 from the audio device 16 may be muted or disconnected by a user with a switch 58 while the user receives or places a call. Once the call is finished, the user may once again trigger the switch to begin listening to music or other audible media. Thus, a user may simultaneously hear and monitor both devices 16, 18 through a single acoustic device 30, 32 and may mute or disconnect at least one of the devices 16, 18 when needed.

In certain embodiments, the coupling device 28 may also include a switch 68 or other control device 68 to control features of the communication device 18, the audio device 16, or a combination thereof. For example, a switch 68 may connect inputs 17 or outputs 15 of the communication device 18 together, connect them to a ground 70, provide control signals to the device 18, or the like, to control features of the communication device 18. For example, a switch 68 or control device 68 may control features of the communication device 18 such as performing a mute command, a call connect command, a call disconnect command, voice-activated dialing, a command to call the last number dialed, or like features. The features activated may vary from device 18 to device 18 and may depend on the device engineering and configuration.

Figure 7:
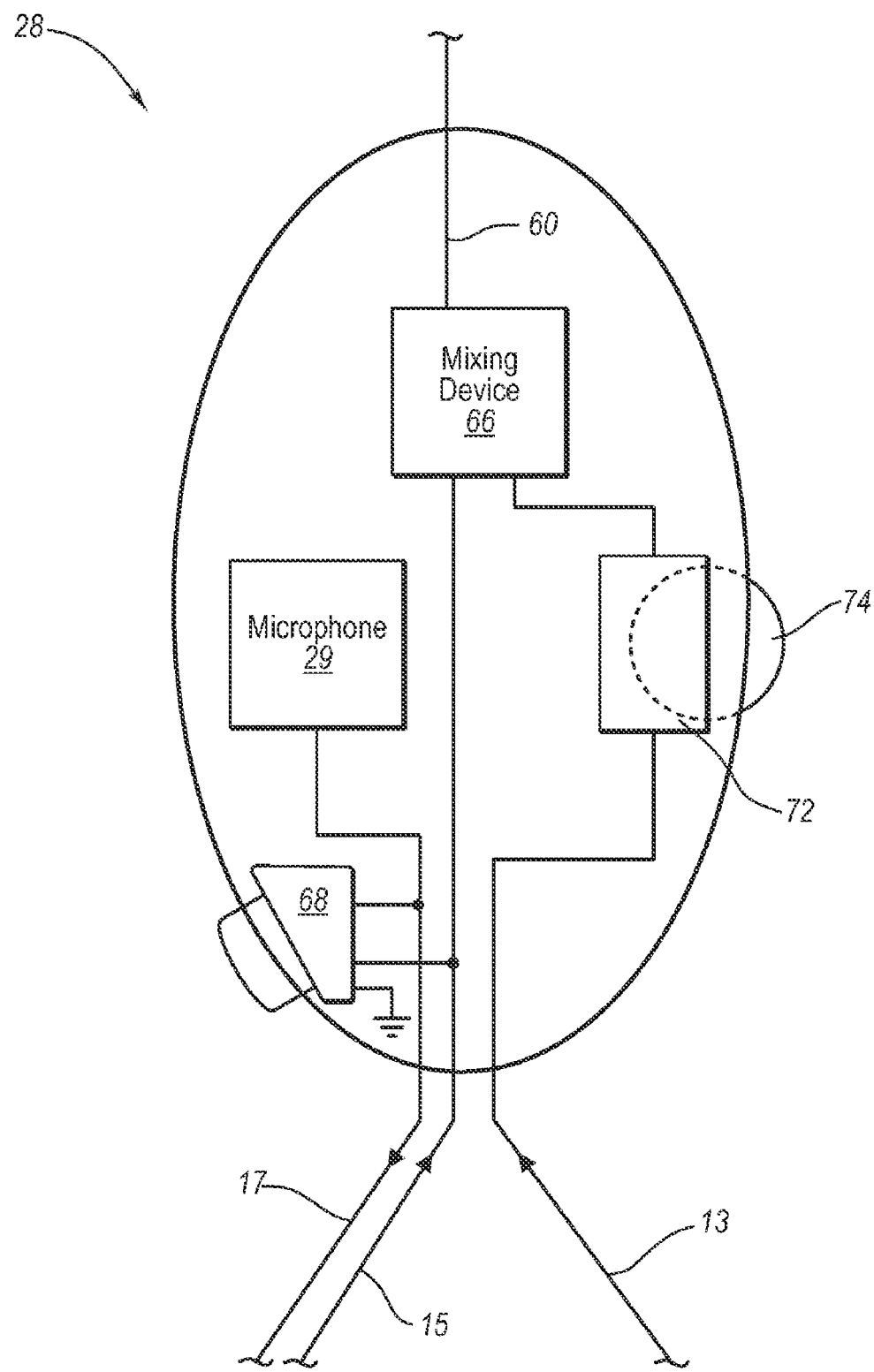
FIG. 7 is a schematic block diagram of another alternative embodiment of components contained within a coupling device in accordance with the invention.

Referring to FIG. 7, in selected embodiments, the coupling device 28 may include a volume controller 72 to control the volume of at least one of the audio signals 13, 15 from the audio device 16 and the communication device 18. For example, as in the previous example, a mixer 66 may provide that audio signals 13, 15 be heard simultaneously by a user through an acoustic device 30, 32. When a call is received or placed on the communication device 18, a user may adjust the volume of the audio signal 13 using the volume controller 72. If desired, the user may adjust the volume such that music or audio material is still heard in the background while receiving or placing a call. Once a call is finished, a user may readjust the volume to a desired level. Thus, a user may simultaneously hear and monitor both devices through a single acoustic device 30, 32, and may adjust the volume of at least one of the devices 16, 18 when desired.

Figure 8:
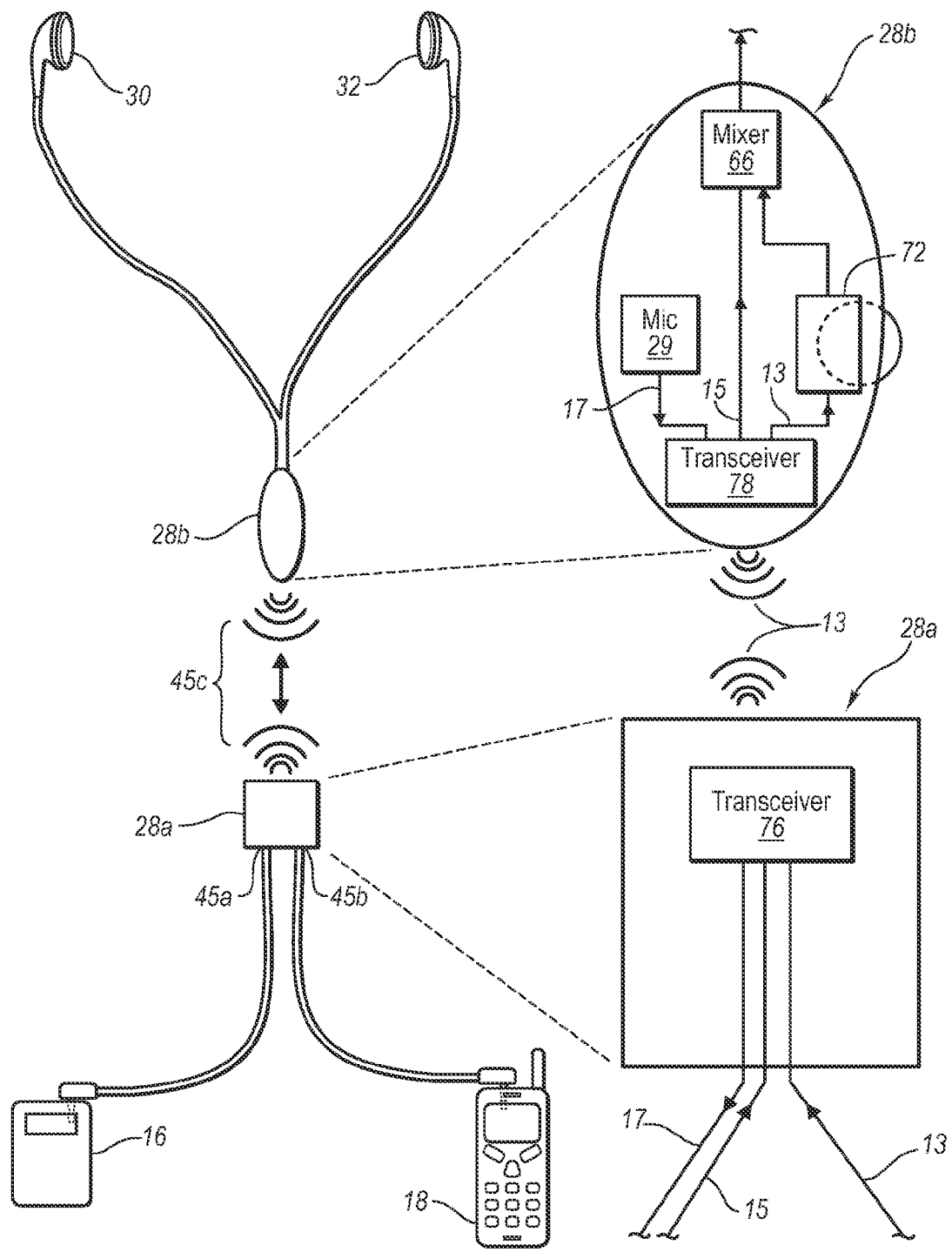
FIG. 8 is a schematic block diagram of one embodiment of a personal portable integrator usable with a music player and a mobile phone using wireless technology.

Referring to FIG. 8, in certain embodiments, a coupling device 28 may be divided into a pair of components 28a, 28b that wirelessly communicate with one another over one or more individual or combined interfaces 45c using a technology such as BLUETOOTH. For example, a first component 28a may include a transceiver 28a receptive to the signals 13, 15, 17 from the audio and communication devices 16, 18. The transceiver 76 may convert these signals to wirelessly transmittable frequencies 80 using an appropriate wireless protocol such that they may be transmitted to a peer transceiver 78. The transceiver 78 may then convert the frequencies 80 back to signals 13, 15, 17, where they may be processed by the coupling device 28b in accordance with a process like those described in FIGS. 5 through 7.

One of ordinary skill in the art will recognize that the wireless technology described in FIG. 8 may be used in a wide variety of different configurations and the example presented herein is not intended to limit the scope of the invention. For example, in certain embodiments, portions or all of the circuitry 29, 66, 72 or components 29, 66, 72 may be located in the housing 28a. In other embodiments, each of the devices 16, 18, may communicate wirelessly with the coupling device 28a at interfaces 45a and 45b.

Still additional embodiments in accordance with the present invention relate to how the technology described herein can be used with, formed in, or otherwise removably coupled to various articles of manufacture for additional personal portability and convenience. For example, the device and technology described herein can be integrated seamlessly in an article of manufacture such as a jacket, coat, backpack, belt pack, helmet (or other head gear), shirt, pants, or the like. That is, the article (e.g., 100, 105, FIGS. 9A-9B) can be manufactured to include a number of internal or external pockets, receptacles, or channels for receiving various aspects of the device(s), wire(s), or control(s), such that the audio reception and transmission technology appears to be part of the article itself. The device can then be used with relative ease and comfort so that the user need not necessarily avoid use of the devices in difficult conditions, such as when skiing or biking, which could make the devices difficult to hold.

Figure 9A:
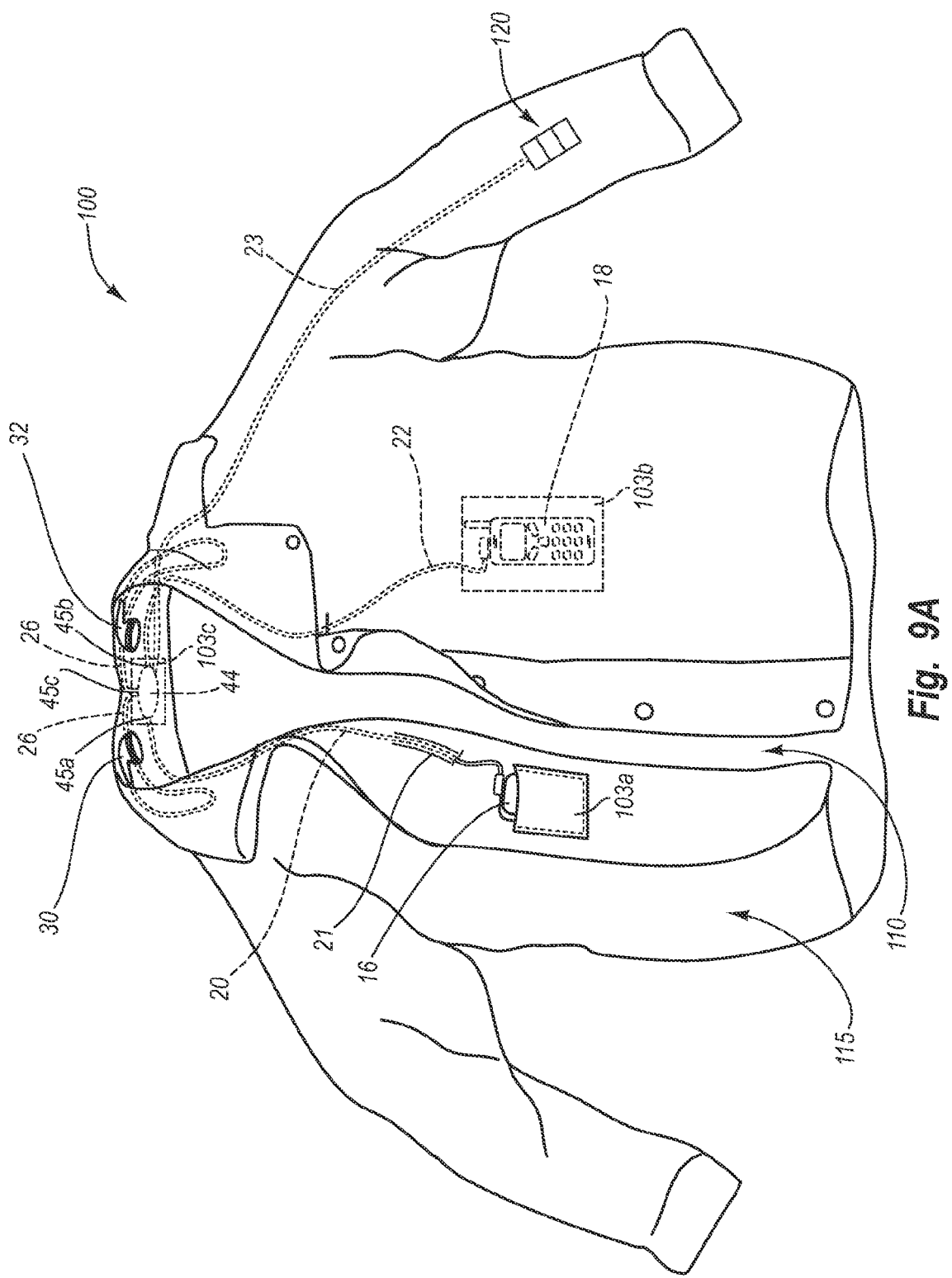
FIG. 9A illustrates one implementation of an article of manufacture that is configured to integrate a music player and a mobile phone using wired or wireless technology.
Figure 9B:
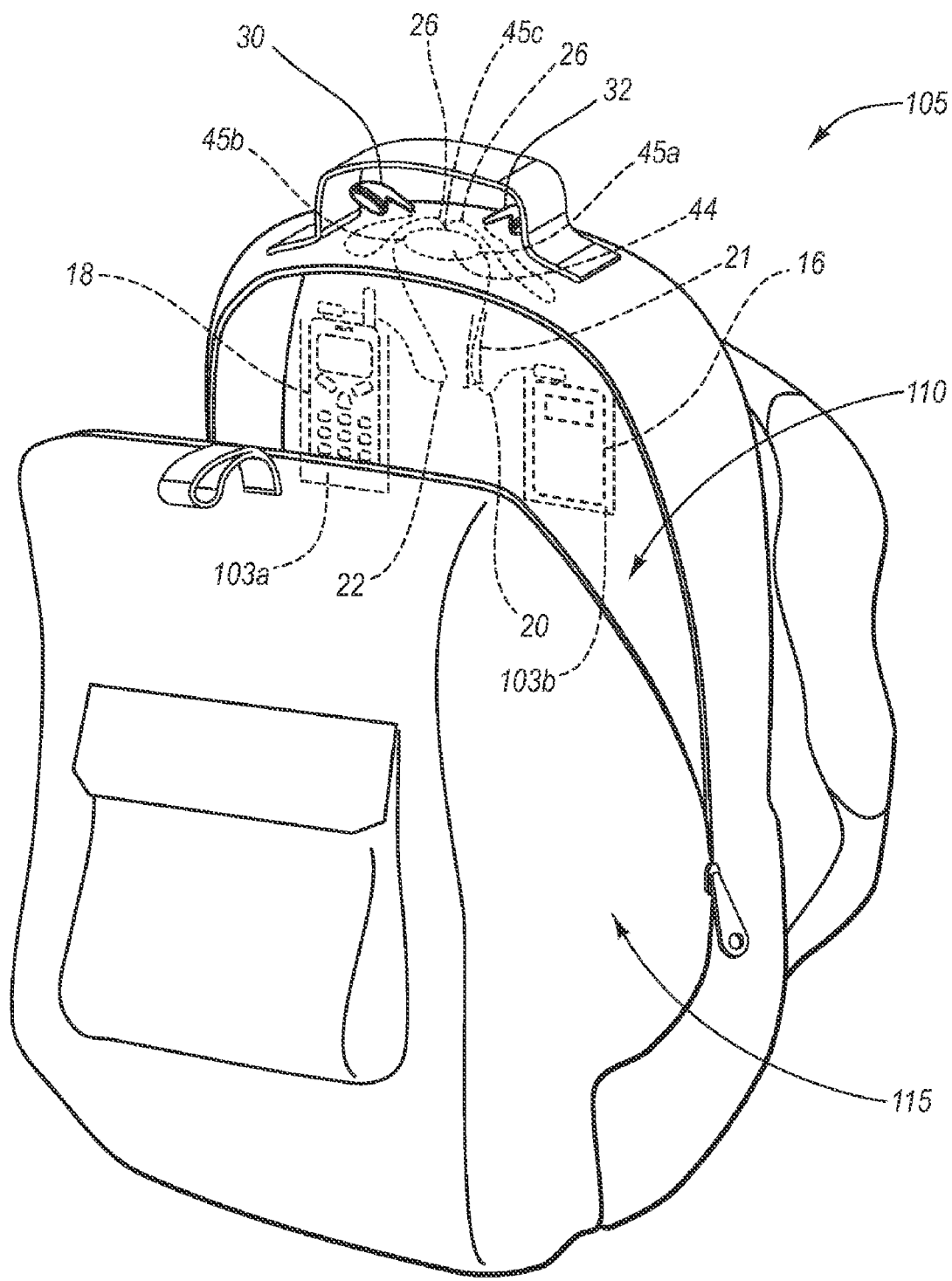
FIG. 9B illustrates another implementation of an article of manufacture that is configured to integrate a music player and a mobile phone using wired or wireless technology.

For example, as shown in FIGS. 9A-B, article 100, 105 has at least a first interface 45a of coupling device 44 for receiving communication from music player 16 (such as a portable MP3 player, tape player, CD player, or the like). This interface 45a can be a wired interface for receiving a stereo plug of any size, but can also be a wireless interface for receiving and/or transmitting wireless communication. In addition, article 100, 105 can include a second interface 45b for receiving a second audio signal from a substantially arbitrarily selectable two-way communication device 18. For example, FIGS. 9A-B show that coupling device 44 is communicably coupled to mobile phone 18 via wire 22. As with interface 45a, however, interface 45b can also be configured with primarily wireless communication means for communicating audio signals to and/or from device 18.

Article 100 can also include a third interface 45c for transmitting (and/or receiving) a third 60 audio signal comprising at least one of the first and second audio signals. For example, FIGS. 9A and 9B show that coupling device 44 receives audio signals from devices 16 and 18, and can send a third audio signal (one of the received first or second signals, or a combined first and second audio signal) through wires 26. As with interfaces 45a-b, third interface 45c can also send the third audio signal wirelessly, where appropriate, to corresponding acoustic devices.

In addition, article 100 can include acoustic device 30, 32, which can convert the audio signal from interface 45c into audible tones for article 100, 105 wearer. Acoustic device 30, 32 can be personal speakers that are inserted in (or built to surround) an ear, or can be larger speakers that are audible up to several feet away.

Additional embodiments of the invention can be shown or described in terms of inside and/or outside portions. For example, FIGS. 9A and 9B show that article 100, 105 includes a primarily inside portion 110 and a primarily outside portion 115. Inside portion 110, such as the inside of jacket 100 or backpack 115, further includes one or more receptacles (or pockets) 103a-b configured to receive an audio delivery device 16 and/or a two-way audio communication device 18. For example, pockets/receptacles 103a-b in FIGS. 9A-9B provide a secure resting place for audio delivery device 16 and mobile phone 18 within inside portion 110.

The article can also include a number of interfaces (not shown) 120 attached to the outside portion 115 for controlling any number of functions. The interfaces 120 can be communicably coupled to coupling device 44 via any number of wires (e.g., 23), or via wireless communication means. The interfaces 120 can provide direct communicative access to switch 58 and volume controller 72 inserted in a pocket (or sewn into) a sleeve, or directly coupled thereto. Switch 58 and volume controller 72 of interfaces 120 are, in turn, communicably connected to coupling device 28, 44, 54, via wire 23, so that the user can toggle between music selections, toggle between the music player or the mobile phone, control volume, or the like.

As shown, article 100 also include one or more wires 20, 22, 26, 34, 36 embedded (e.g., formed, prepared, or otherwise sewn) therein for communicating an audio signal 13, 15, 17, 60 from a first point to a second point. For example, jacket 100 or backpack 105 can be formed with one or more channels 21 for holding a wire that connects the audio delivery device to a coupling device 28, 44. Channels 21 can be a separate piece of fabric that is sewn to the inside portion 110 for the entire length of the corresponding wire. Alternatively, the one or more channels 21 can comprise holes, notches, or clips on in the inside portion 110 or outside portion 115, which can secure the one or more wires at specific points. In any event, there need not necessarily be a wire and corresponding channel 21 for each device, or for an entire length of wire, used with the article, particularly where some devices may communicate to a coupling device 28, 44, 54 via wireless communication.

In addition, still another embodiment in accordance with the present invention includes an article 100, 105 including a first pocket 103a having an audio delivery device 16 inserted therein. Article 100, 105 also includes a second pocket 103b having a two-way communication device 18 inserted therein. Article 100, 105 still further includes a third pocket 103c for receiving an audio communication hub 28, 44, 54 which has one or more interfaces 45a-c for communicating with the audio delivery device and with the two-way communication device 18.

The audio communication hub 28, 44, 54 can be connected directly to each audio device via electrical wiring 20, 22, 26, 34, 36 embedded in the article 100, 105; or can be connected wirelessly via any number of wireless communication protocols. For example, as previously stated, article 100, 105 can include one or more channels 21 formed therein for receiving at least one communication wire 20, 22, 26, 34, 36. Alternatively, article 100 can be configured to provide electrical communication via wires only to the mobile phone 18 or to the audio delivery device 16, and be further configured communicate with a communication hub 28, 44 using BLUETOOTH, or another wireless communication protocol.

Thus, for example, the articles 100 and 105 could alternatively be represented without one or both of wires 20 and 22. Furthermore, wire 23 can also be omitted, in the event interface 120 is configured to remotely and/or wirelessly control audio communication hub 28, 44, 54. Thus, audio communication hub 28, 44, or 54 can be configured to receive and transmit wireless signals to and/or from a number of devices 16, 18, 120, etc. in a given article 100, 105, etc. In one implementation, this can allow a given user to have access of a device via headphones 30, 32 simply by inserting a given audio delivery device in a given pocket. In the case of using a BLUETOOTH enabled audio communication hub 28, 44, or 54, if the user has registered a mobile phone 18 with the audio communication hub, the user will likely be able to begin immediate communication through the cell phone simply by placing the mobile phone 18 into pocket 103a or 103b, as appropriate.

Accordingly, there are a number of ways in which a personal article can be configured to integrate multiple forms of audio communication, to thereby fuse various devices and protocols with wearable materials. In particular, in addition to jackets, backpacks, belt packs, or helmets, other articles that can integrate this technology include shirts, pants, shoes, eyewear, goggles, sunglasses, caps, or the like. Even the headphones themselves can be configured to completely integrate an audio communication hub 28, 44, or 54, which can eliminate one or more of the wires 20, 22, 23, and/or 26 illustrated herein. As described above, this can allow a user to use a headphone device configured with wireless communication simply by bringing the given audio delivery device in 16, 18, etc. within an appropriate range or distance. Accordingly, as audio and switching devices become smaller and more lightweight, the options for incorporating the portable integration technology into other wearable items are essentially limitless.

The present invention may therefore be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

I claim:

1. An article of manufacture configured to receive a portable apparatus therein for integrating a two-way communication device and an audio delivery device, the article comprising:
   an article having a primarily inside portion and a primarily outside portion, the inside portion including:
      one or more receptacles configured to receive an audio delivery device, a two-way audio communication device, and a coupling device; and
      one or more wires embedded in the article of manufacture for communicating an audio signal from a first point to a second point;
   the outside portion including:
      one or more control interfaces for receiving user input to control at least one of audio device selection, volume control, and music selection, the one or more control interfaces being physically separate from the coupling device;
      wherein the one or more control interfaces communicate user input wirelessly to the coupling device.

2. The article as recited in claim 1, wherein the inside portion further includes one or more receptacles configured to receive a first transceiver and a second transceiver, the first and second transceivers being configured to communicate wireless audio signals from the audio delivery device and the two-way audio communication device to the coupling device.

3. The article as recited in claim 1, further comprising one or more speakers inserted into any of the inside portion or the outside portion, the one or more speakers configured to produce an audible sound in response to an audible signal received from any one or more of the audio delivery device or the two-way audio communication device.

4. The article as recited in claim 1, wherein the article is one of a jacket, a backpack, or a belt pack.

5. The article of manufacture as recited in claim 1, wherein the one or more control interfaces include a first switch for selectively switching between a first and a second audio signal to provide a third audio signal.

6. The article of manufacture as recited in claim 1, further comprising a mixer for mixing a first and a second audio signal to create a third audio signal.

7. The article of manufacture as recited in claim 1, further comprising a microphone for transmitting a voice signal to the two-way audio communication device.

8. The article as recited in claim 1, wherein:
   the coupling device is physically separate from the one or more control interfaces; and
   the coupling device contains at least one of a microphone, a switch, a mixer, and a volume controller.

9. An article of manufacture configured for portable personal use to facilitate integrated communication using a two-way communication device and an audio delivery device, the article comprising:
   one of a jacket, a personal carrier, or a headgear including:
      a first pocket having an audio delivery device inserted therein, the audio delivery device being adapted to wirelessly transmit a first audio signal;
      a second pocket having a two-way communication device inserted therein, the two-way communication device being adapted to wirelessly transmit a second audio signal;
      a third pocket for receiving an audio communication hub, the audio communication hub having an interface to communicate with the audio delivery device including to wirelessly receive the first audio signal, and an interface to communicate with the two-way communication device including to wirelessly receive the second audio signal;
      an exterior surface comprising one or more control interfaces for receiving user input to control at least one of the audio delivery device, the two-way communication device, or the audio communication hub; and
      one or more channels formed in the article of manufacture for receiving at least one communication wire.

10. The article as recited in claim 9, further comprising one or more acoustic devices attached thereto, the one or more acoustic devices configured to produce an audible sound in response to an audio signal passed from the audio communication hub.

11. The article as recited in claim 10, wherein the at least one communication wire connects the audio communication hub to the one or more acoustic devices, and the article contains no other communication wires other than the at least one communication wire connecting the audio communication hub to the one or more acoustic devices.

12. The article as recited in claim 9, wherein the one or more control interfaces wirelessly communicate with the audio communication hub.

13. The article as recited in claim 9, wherein:
   the audio communication hub comprises at least two physically separate devices; and
   the at least two physically separate devices comprise means for enabling wireless communication between the at least two physically separate devices.

14. The article as recited in claim 13, wherein at least one of the audio delivery device and two-way communication device is electrically connected via one or more electrical wires to one of the two physically separate devices, such that the at least one electrically connected device is thereby adapted to wireless transmit an audio signal.

15. The article as recited in claim 14, wherein the one or more control interfaces are connected to the audio communication hub via one or more wires.

16. An integrated article of manufacture comprising:
   any of an article of clothing or a backpack having a portable and wireless apparatus embedded therein for wirelessly integrating a portable two-way communication device and a portable audio delivery device, wherein the portable and wireless apparatus is configured in size and shape to be portably carried in either a hand of a user or an article of clothing during use of the portable and wireless apparatus, the portable and wireless apparatus comprising:
      means for wirelessly receiving a first audio signal from a substantially arbitrarily selectable and portable audio delivery device, wherein the audio delivery device is configured in size and shape to be portably carried in either a hand of a user or an article of clothing;
      means for wirelessly receiving a second audio signal from a substantially arbitrarily selectable and portable two-way communication device, wherein the portable two-way communication device is configured in size and shape to be portably carried in either a hand of a user or an article of clothing; and a coupling device independent from the audio and two-way communication devices but portable with the audio and two-way communication devices by the same user during use of the coupling device, wherein the second audio signal is characterized by a threshold value, the second audio signal is accorded priority relative to the first audio signal, and the second audio signal interrupts the first audio signal upon reaching the threshold value, the coupling device comprising said means for receiving said first and second audio signals, said coupling means further comprising:

means for transmitting a third audio signal comprising at least one of the first or second audio signals to an acoustic device adapted to convert the third acoustic wave to an audio range corresponding to a hearing range of a user.

17. The article as recited in claim 16, wherein:
the coupling device further comprises a mixer to mix the first and second audio signals; and
the mixer is configured to enable the first and second audio signals to be heard simultaneously as the third audio signal until either the first or second audio signal is selected by the user.

18. The article as recited claim 16, wherein:
the means for wirelessly receiving any of the first audio signal or the second audio signal comprises one or more wireless transceivers electrically connected to the corresponding audio delivery device or two-way communication device; and
the coupling device is adapted to receive the corresponding first audio signal or second audio signal wireless through the one or more wireless transceivers.

19. The article as recited in claim 16, further comprising a control interface communicably coupled to the coupling device.

20. The article as recited in claim 19, wherein the control interface is configured to enable a user to toggle between the first and second audio signals, and to control volume of the third audio signal.

* * * * *